(12) United States Patent
Gong

(10) Patent No.: US 8,526,421 B2
(45) Date of Patent: Sep. 3, 2013

(54) ARRANGEMENT AND APPROACH FOR TIME SLOT INDEX SYNCHRONIZATION FOR WIRELESS COMMUNICATIONS

(75) Inventor: Ming Gong, Shanghai (CN)

(73) Assignee: NXP B.V., Eindhoven (NL)

( * ) Notice: Subject to any disclaimer, the term of this patent is extended or adjusted under 35 U.S.C. 154(b) by 427 days.

(21) Appl. No.: 12/918,934

(22) PCT Filed: Feb. 25, 2009

(86) PCT No.: PCT/IB2009/050764
§ 371 (c)(1),
(2), (4) Date: Aug. 23, 2010

(87) PCT Pub. No.: WO2009/107077
PCT Pub. Date: Sep. 3, 2009

(65) Prior Publication Data
US 2010/0322230 A1    Dec. 23, 2010

Related U.S. Application Data

(60) Provisional application No. 61/031,287, filed on Feb. 25, 2008.

(51) Int. Cl.
*H04J 3/06*    (2006.01)
(52) U.S. Cl.
USPC .......................................... 370/350
(58) Field of Classification Search
USPC ........................................ 370/350
See application file for complete search history.

(56) References Cited

U.S. PATENT DOCUMENTS

| 8,094,611 B2* | 1/2012 | Li et al. ........................ 370/328 |
| 2006/0002405 A1* | 1/2006 | Le Sauze et al. ............ 370/401 |
| 2006/0222108 A1 | 10/2006 | Cousineau |
| 2006/0280142 A1* | 12/2006 | Damnjanovic et al. ....... 370/329 |
| 2008/0002567 A1* | 1/2008 | Bourlas et al. ............... 370/208 |
| 2009/0092037 A1* | 4/2009 | Hadad ........................ 370/207 |
| 2009/0196163 A1* | 8/2009 | Du .............................. 370/204 |
| 2009/0274112 A1* | 11/2009 | Ma et al. ..................... 370/330 |
| 2010/0226334 A1* | 9/2010 | Ma et al. ..................... 370/329 |
| 2012/0163253 A1* | 6/2012 | Sezgin et al. ............... 370/280 |

FOREIGN PATENT DOCUMENTS

| CN | 1407745 A | 4/2003 |
| WO | 00/70803 A1 | 11/2000 |

OTHER PUBLICATIONS

International Search Report for Application PCT/IB2009/050764 (February 25, 2009).

* cited by examiner

*Primary Examiner* — Mark Rinehart
*Assistant Examiner* — Christopher R Crompton

(57) ABSTRACT

The time slot index for wireless signals is synchronized using an approach that facilitates rapid synchronization acquisition and tracking synchronization recovery. According to an example embodiment, a synchronization circuit (e.g., 300) uses data in symbols of a particular signal frame (e.g., 120) to set a time slot index synchronization characteristic for an acquired wireless signal, and further to track time slot index synchronization during processing of the signal.

12 Claims, 3 Drawing Sheets

ARRANGEMENT AND APPROACH FOR TIME SLOT INDEX SYNCHRONIZATION FOR WIRELESS COMMUNICATIONS

The present invention relates generally to communications, and more specifically, to circuits and methods for synchronizing the time slot index for wireless communications.

The communication of data over wireless mediums has increased tremendously in recent years. In particular, the use of mobile telephones, PDAs, media players and other mobile devices has increased dramatically. As these devices are used more and more, high demands have been placed upon the ability of these devices to communicate significant amounts of data for a variety of purposes. For example, there has been an increased demand for the use of hand-held devices in the presentation of media such as audio, images and video.

Satellite Terrestrial Interactive Multi-service Infrastructure (STiMi) is a physical scheme for China Mobile Multimedia Broadcasting that has been released as industrial standard of the State Administration of Radio Film and Television (SARFT) of the People's Republic of China, with the index of GY/T 220.1-2006. This standard is related to the wireless communication of data such as Digital TV (DTV) to handheld mobile devices.

Proper decoding of signals received using broadcasting approaches such as STiMi is generally dependent upon proper synchronization, and upon proper decoding of logical control information, which is often transmitted on a limited basis. In this regard, when the detection of index information fails, there is a delay in receiving broadcasting service, corresponding to the limited transmission of control information. Accurate detection of index information is particularly challenging when the signal is communicated over certain wireless channels, such as those having low carrier-to-noise ratio (CNR), long channel time disperse and/or fast fading. Under such conditions, the reliable and fast detection of index information in signal acquisition is challenging.

Certain wireless channel conditions may not only present challenges to the synchronization at different levels in an acquisition phase, they may also present challenges to synchronization in the tracking phase of wireless signal processing. For instance, when in tracking mode, many receivers narrow their filter bandwidth in the tracking loop to increase the synchronization accuracy and stability. However, if the receiver is out of synchronization, the accuracy and/or stability can be undesirably affected. Synchronization failure detection can take time, cause delays and, in many applications, lacks detail as to the nature of the failure. When a failure occurs, the receiver may need to re-start blindly, resulting in significant delays.

The above and other issues continue to present challenges to wireless communications.

Various aspects of the present invention are directed to arrangements for and methods of processing data in a manner that addresses and overcomes the above-mentioned issues and other issues as directly and indirectly addressed in the detailed description that follows.

According to an example embodiment, a synchronizing circuit arrangement includes a receiver and a synchronizer. The receiver receives wireless signals from a remote wireless transmitter and processes the wireless signals in accordance with a synchronization condition. The wireless signals include signal frames with a plurality of sequential time slots in each frame, and are processed using a synchronization condition to synchronize the receiver circuit with the remote wireless transmitter. The synchronizer detects a beacon at the front of a time slot in a signal frame and uses the beacon to set the synchronization condition for the received signal frame. With the synchronization condition set, the synchronizer then uses data in symbols that follow the beacon in the time slot to fine tune the synchronization condition. This approach is useful, for example, during an acquisition phase when the receiver is acquiring synchronization with the remote wireless transmitter.

During a tracking phase, the synchronizer detects a synchronization failure as a function of a quality characteristic of a sub-channel of one of the received signal frames. In response to detecting a synchronization failure in a signal frame, the receiver circuit is controlled to resynchronize the time slots (e.g., via direct control and/or by setting synchronization conditions).

The above summary is not intended to describe each embodiment or every implementation of the present invention. Other aspects of the invention will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
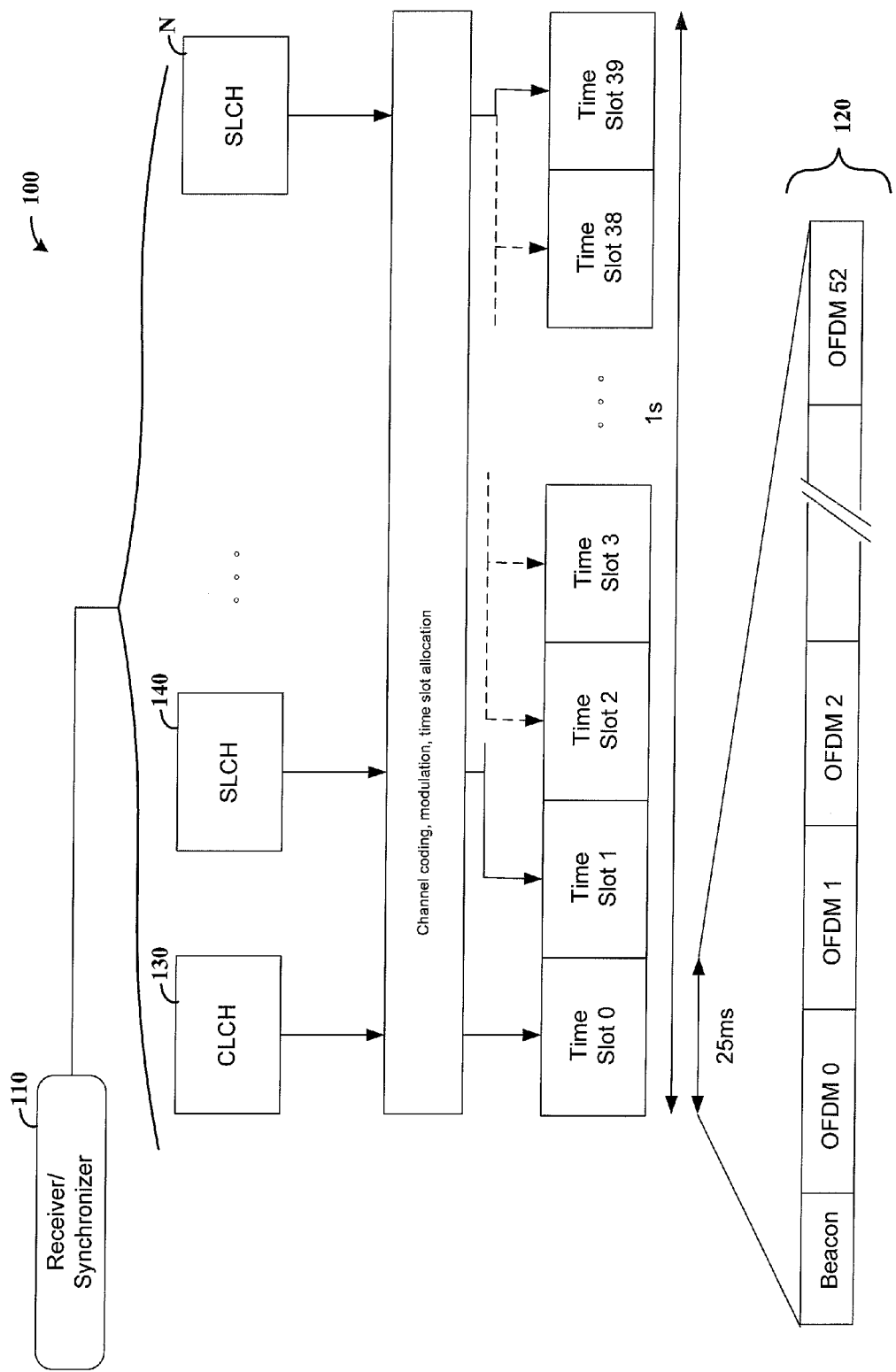
FIG. 1 shows a wireless signal frame and receiver for processing signals, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of arrangements and approaches for wireless communications and the processing of wireless signals. While the present invention is not necessarily limited to such applications, an appreciation of various aspects of the invention is best gained through a discussion of examples in such an environment.

According to an example embodiment of the present invention, a wireless signal synchronization approach involves using embedded synchronization data in portions of a signal frame at a wireless receiver to synchronize the processing of data in the wireless signal. The synchronization data is embedded at different portions of the wireless signal (i.e., in different data units) to ensure that the processing of data in the signal maintains synchronization throughout each signal frame. In some applications, this approach is used with a wireless signal, such as a media signal that is in accordance with the Satellite Terrestrial Interactive Multi-service Infrastructure (STiMi) broadcasting scheme implemented for digital television, which is arranged in units of a predefined time period, with each unit corresponding to a wireless signal frame. These approaches are used to mitigate the need to re-process, re-set or otherwise delay the receipt and processing of information carried by a wireless signal due to synchronization issues.

Various embodiments of the present invention are directed to an entire system involving a transmitter of a wireless signal as described above, a receiver and any related equipment used in connection with the signal, such as a video or audio device. Other embodiments are directed to one or more of various circuits or devices for such a system and/or a related system. For instance, some embodiments are directed to a wireless signal receiver circuit that uses time slot information to provide a synchronization control signal. Other embodiments are directed to a separate wireless signal transmitter and receiver that work together to facilitate the accurate and efficient transmission of data. The following examples describe one or more embodiments that may be related to these applications.

Turning now to the figures, FIG. 1 shows a wireless signal frame 100 implementing embedded synchronization data, which is processed by a receiver 110 having an index synchronizer circuit to facilitate the receipt and use of data in the signal frame, according to another example embodiment of the present invention. The signal frame 100 is set to a time period of one second, and the frame is divided into 40 time slots, each of which is 25 ms and which are respectively labeled time slot 0 (zero) through time slot 39, with ellipses illustrating certain slots for brevity. As represented at 120, each time slot includes 1 (one) beacon and 53 Orthogonal Frequency Division Multiplexing (OFDM) symbols. In every (1 second) frame, the first time slot, which is TS0 (time slot zero), is exclusively used to bear control information in a control logic channel (CLCH) 130, which includes physical signaling for the other time slots and logical control information for the up layer data. Other time slots, from TS1 to TS39, can be separated as groups to bear data for a service logical channel (SLCH), with example groups represented as SLCH 140-SLCH N.

The receiver 110 decodes the logical control information in TS0 in order to decode data in the service logic channel (TS1-TS39), using the start of TS0 and/or the index of the time slot being decoded for synchronization. For instance, in the physical layer specification of the STiMi scheme, the index of the time slots is modulated on part of continuous pilots (pilot signals transmitted with data in the signal frame 100). To ensure proper receipt and processing of data carried by the signal frame 100 using the STiMi scheme, the TS index is synchronized with the transmitter of the data for the working duration of the receipt and processing of the signal channel 100. With proper synchronization of the time slot index with the transmitter, the receiver 110 can decode TS0, from which logical control information can be de-multiplexed.

The receiver 110 uses a time slot index synchronizer, in a signal processing chain (e.g., in the middle of the chain), to facilitate the detection of a synchronization failure. If the synchronizer indicates synchronization failure, the receiver re-starts to re-synchronize. If a data link failure is detected and the time slot index is still in synchronization (as indicated via the index synchronizer), the receiver 110 resets its decode module and de-multiplex module, and/or refines parameters in its synchronizer circuit, and continues to process received signals.

Figure 2:
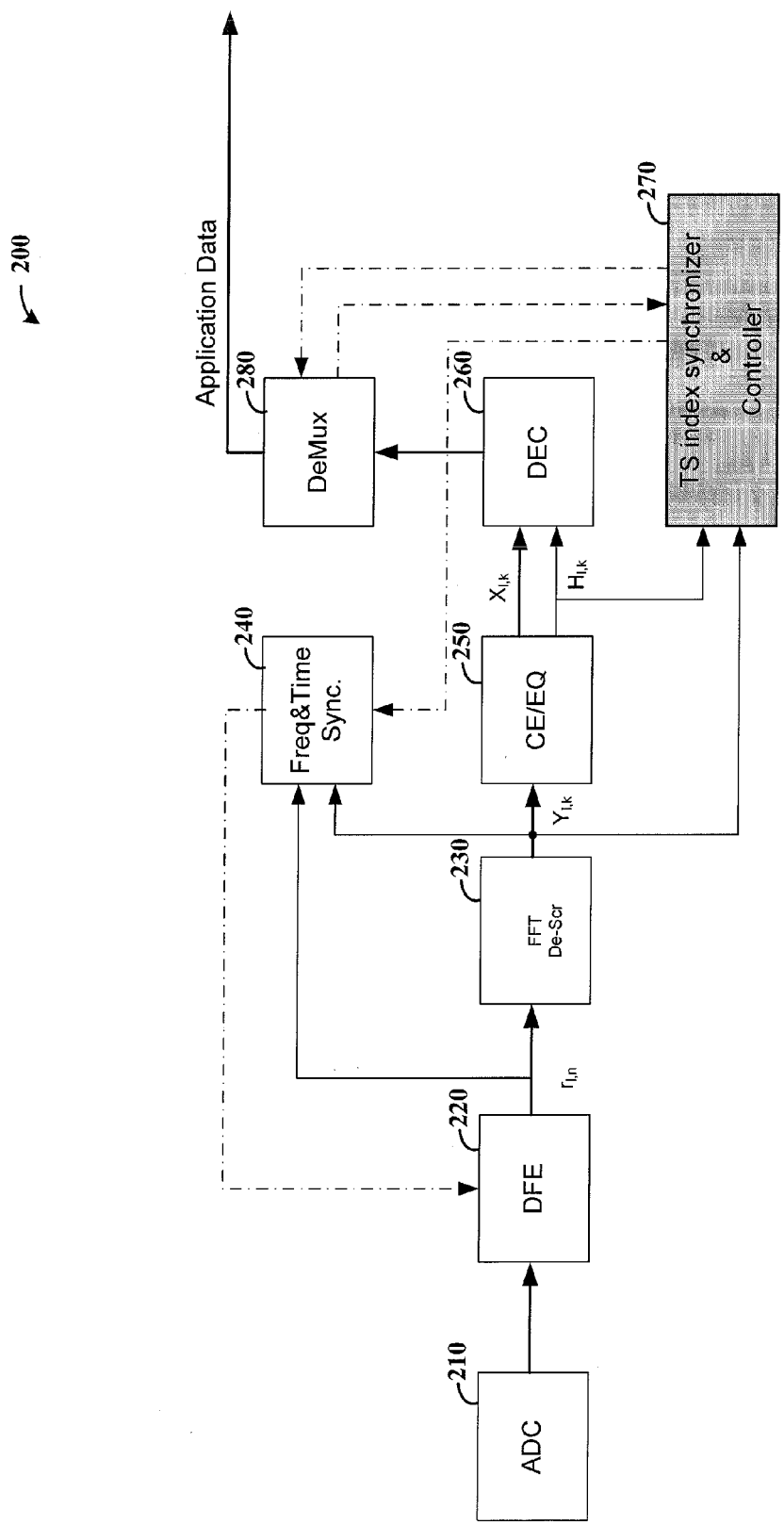
FIG. 2 shows a wireless signal receiver arrangement having an index synchronizer circuit, according to another example embodiment of the present invention.

FIG. 2 shows a wireless signal receiver arrangement 200 having an index synchronizer circuit 210, according to another example embodiment of the present invention. The receiver arrangement 200 may be implemented, for example, in connection with the approaches shown in and described above in connection with FIG. 1 (e.g., as the receiver 110). In this regard, FIG. 2 is illustratively discussed in the context of the processing of wireless signals for a STiMi-type approach, using a one-second signal frame as shown in FIG. 1. However, various embodiments and implementations involving FIG. 2 and the discussion thereof may be implemented with other signal processing approaches.

The receiver arrangement 200 includes an analog-to-digital converter (ADC) 210 that receives and samples a wireless signal (e.g., from a radio frequency (RF) module internal or external to the receiver arrangement), and feeds a digital signal to a digital front end (DFE) circuit 220. The output from the DFE 220 is passed to a fast Fourier transform (FFT) and descrambler (De-Scr) processor 230, and to a frequency and time synchronizer 240. The frequency and time synchronizer 240 acquires the initial synchronization of the carrier frequency and symbol timing for a signal sampled by the ADC 210, and uses the information to determine or detect the boundary of the signal frame (e.g., a 1 second frame).

OFDM symbols are extracted as data blocks at the FFT-De-Scr 230 from the output of DFE 220, with removal of a guard interval (GI) or other delay used to separate transmissions. After FFT and de-scrambling processing, a channel estimater/equalizer 250 estimates the signal carried on sub-carriers, slices the estimated signals into soft metrics for bits, and feeds the bits to a decode module 260 that decodes the bits and provides the decoded bits to a de-multiplex module 280.

A time slot synchronizer and controller 270 is coupled to receive a sub-carrier output from the channel estimater/equalizer 250 as well, and further to receive an output from the de-multiplex module 280. In this regard and again referring to the above discussion with FIG. 1, time slot index information is embedded on sub-carriers that are used as continuous pilots and provided to the time slot synchronizer and controller 270, which uses the information in controlling the receiver arrangement 200 relative to synchronization issues.

In these contexts, the signal transmitted in the l-th OFDM symbol is $$s_l(n) = \frac{1}{N}\sum_{k=0}^{N-1} a_{l,k} D_{l,k} e^{j2\pi\frac{kn}{N}} \quad (1)$$

where N is the total number of carriers. $a_{l,k}$ is the data on the k-th sub-carrier in the l-th OFDM symbol and $D_{l,k}$ is the scrambling code used on the k-th sub-carrier in the l-th OFDM symbol. In any 1 second frame (or as relative to other signal frame time periods), the index l ranges from 0 to 52. In every OFDM symbol, a set of sub-carriers is selected as continuous pilots. Time slot index information is embedded on some of these sub-carriers.

The current TS index, which ranges from 0 to 39, is mapped into 6 bits $b=\overline{b_5 b_4 b_3 b_2 b_1 b_0}$ and these 6 bits are carried on sub-carriers of every OFDM symbol in the $b^{th}$ TS. The sub-carriers arrangement of TS index information is shown in table 1.

TABLE 1

| Bit i | Bf = 8 MHz, N = 4096, Si | Bf = 2 MHz, N = 1024 Si |
|---|---|---|
| 0 | 23, 651, 2880, 3486 | 21 |
| 1 | 79, 689, 2936, 3530 | 33 |
| 2 | 93, 713, 2968, 3594 | 73 |
| 3 | 169, 741, 3028, 3598 | 89 |
| 4 | 175, 773, 3082, 3668 | 129 |
| 5 | 245, 847, 3114, 3670 | 147 |

In these implementations, $$a_k = (1-2\overline{b_i})(1+j) \text{ if } k \in S_l \quad (2)$$

where $j=\sqrt{-1}$.

For a STiMi receiver (200), after a received signal is processed in an FFT module and de-scrambled (at 230), the received signal in frequency domain is $$X_{l,k} = H_{l,k} a_{l,k} D_{l,k} D_{l,k}^* + W_I + W_{l,k} \qquad (3)$$
$$= H_{l,k} a_{l,k} + W_I + W_{l,k}$$

where $H_{l,k}$ is the impulse response in frequency domain for the k-th sub-carrier in the l-th OFDM symbol. $W_I$ represents interference due to possible inter-carrier interference (ICI) and/or inter-symbol interference (ISI), and $W_{l,k}$ is additive white Gaussian noise (AWGN).

In the Channel Estimator (CE)/Equalizer (EQ) module 250, the channel transfer function $H_{l,k}$ is estimated as $\hat{H}_{l,k}$ with the aid of scatter pilots in the OFDM. The transmit data on the sub-carriers is equalized at 250 with a one-tap equalizer.

$$\hat{a}_{l,k} = Y_{l,k} = \frac{\hat{H}_{l,k}^* X_{l,k}}{|\hat{H}_{l,k}|^2} \qquad (4)$$

Generally, the i-th bit for the TS index can be estimated as $$\hat{b}_i = \left(1 - \text{sign}\left\{\text{Re}\left[\sum_{l=L_1}^{L_2} \sum_{k \in S_i} \hat{a}_{l,k}(1-j)\right]\right\}\right)/2 \qquad (5)$$

where sign(x)=1 when x>=0 and sign(x)=−1, when x<0, and [$L_1, L_2$] is the range of the statistic variable accumulation of multiple successive OFDM symbols. However, to facilitate various embodiments, the received signal is weighted by the quality of sub-channels in the frequency domain in accordance with the following:

$$\hat{b}_i = \left(1 - \text{sign}\left\{\text{Re}\left[\sum_{l=L_1}^{L_2} \sum_{k \in S_i} \hat{H}_{l,k}^* X_{l,k}(1-j)\right]\right\}\right)/2 \qquad (6)$$
$$= \left(1 - \text{sign}\left\{\left[\sum_{l=L_1}^{L_2} \sum_{k \in S_i} \text{Re}(\hat{H}_{l,k}^* X_{l,k}) + \text{Im}(\hat{H}_{l,k}^* X_{l,k})\right]\right\}\right)/2$$

Figure 3:
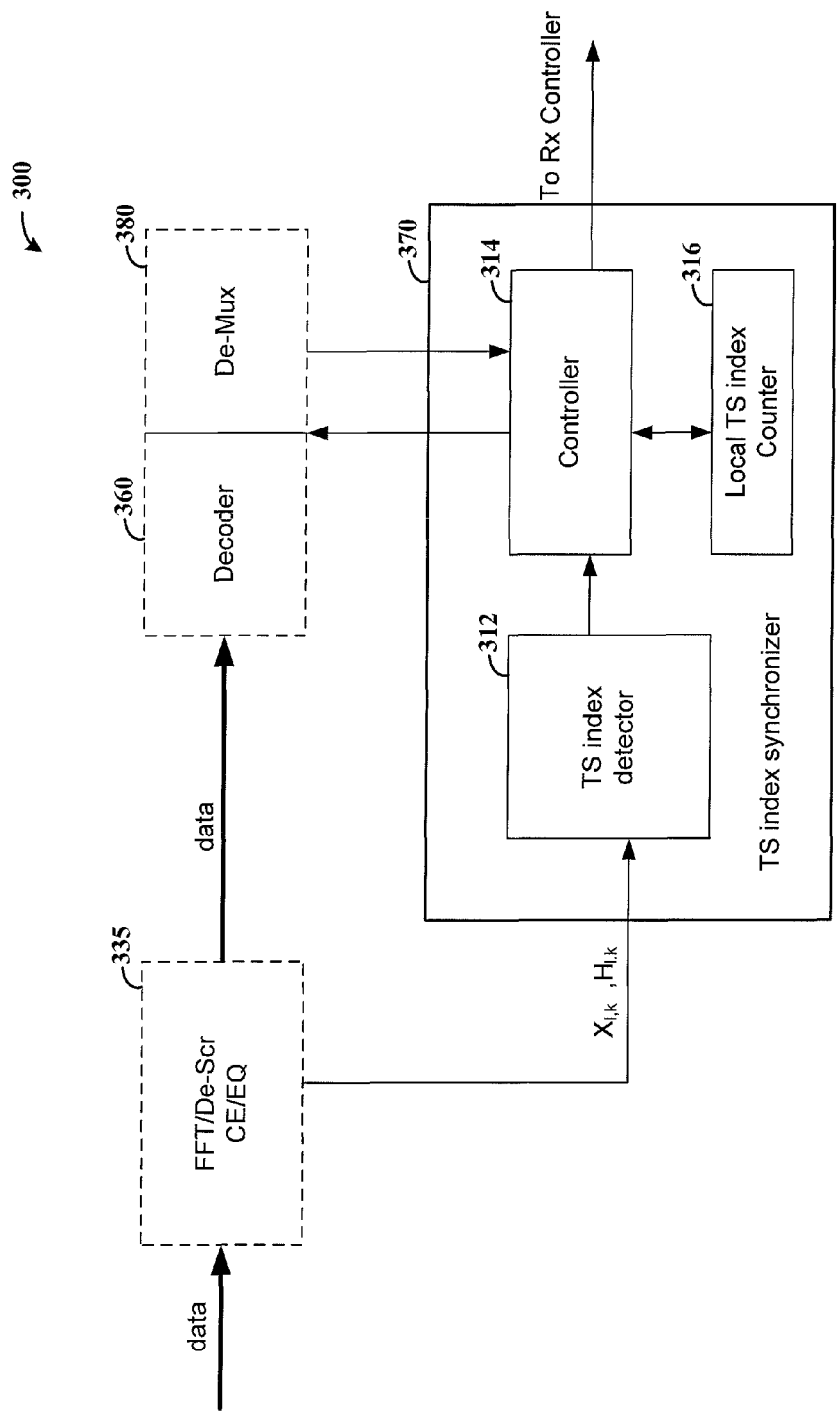
FIG. 3 shows a time slot index synchronizer circuit arrangement, according to another example embodiment of the present invention.

FIG. 3 shows a time slot index synchronizer circuit arrangement 300 for synchronizing signals using a bit estimation approach as characterized in Equation 6 (or a similar approach), according to another example embodiment of the present invention. The circuit arrangement 300 is shown as including and/or functioning with a multi-function module 335 that carries out fast Fourier transform (FFT), descrambler (De-Scr), channel estimator (CE) and equalizer (EQ) functions. A time slot index synchronizer 370 is coupled to receive information from the module 335 and further to communicate with decoder and de-multiplexer blocks 360 and 380, which may be included as part of the circuit arrangement 300. The synchronizer 370 includes a TS (time slot) index detector 312, a controller 314 and a local TS index counter 316, which work to synchronize received wireless communications, such as signals represented in and discussed above in connection with FIG. 1 and the STiMi scheme.

The time slot index synchronizer circuit arrangement 300 is applicable for use in connection with the above discussion with FIG. 1 and with FIG. 2. Regarding the receiver arrangement 200 shown in FIG. 2, certain items in FIG. 3 are labeled in a manner that is similar to related items in FIG. 2 for illustration. For instance, the FFT De-Scr 230 and CE/EQ 250 in FIG. 2 can be implemented together as represented at module 335 in FIG. 3. The decoder 260 and de-multiplexer 280 from FIG. 2 may be similarly implemented at decoder and de-multiplexer (de-mux) blocks 360 and 380 in FIG. 3. The TS index synchronizer 270 may be implemented in a manner consistent with the time slot index synchronizer 370, and the related discussion relative to Equation 6 and as further discussed below.

In the acquisition phase, the circuit arrangement 300 starts and finds a time slot boundary with the aid of a beacon signal in the front of a time slot (see, e.g., the beacon leading the OFDM symbols at 120 in FIG. 1), and reaches a coarse frequency/time synchronization condition. The arrangement 300 detects a scrambling code series in OFDM symbols following the beacon and uses the detected series to fine tune time/frequency synchronization. Concurrently, channel estimation and equalizer functions are initiated at module 335.

For the detection of the time slot index at 312 in the first starting time slot (TS0), $L_1$ is set to 15 and $L_2$ is set to 52 in Equation 6 above. Meanwhile, the equalized data collected in TS0 is fed into the decoder/de-mux module(s) 360/380 to be decoded and de-multiplexed as data for TS0. The following algorithm is implemented accordingly, starting with the first time slot (TS0):

```
IF    (a) the TS index is detected as "0" and
      (b) the decoder/de-mux 360/380 indicates the check result of the
      decoded data is
correct,
THEN
      the TS index is acquired,
      the TS index synchronizer (370) jumps into tracking phase.
ELSE
      record the detected TS index as q.
      continue the TS index detection in the next TS and let L₁=0
      and L₂=52.
      let C = 0;
END
```

After TS0 is processed in accordance with the above algorithm, information is collected at the end of each subsequent time slot (e.g., beginning with TS1 as shown in FIG. 1), and collected equalized data for TS0 is fed into the decoder/de-mux module 360/380 to be decoded and de-multiplexed as TS0 data. The following algorithm is implemented accordingly:

```
IF    (a) the TS index is detected as "0" and
      (b) the decoder/de-mux 360/380 indicates that the check result of the
decoded data is correct,
THEN
      the TS index is acquired,
      the TS index synchronizer jumps into tracking phase.
ELSE
      for a current detected TS index of "p,"
         IF (p+40−q) mod 40 = 1,
            THEN C = C+1;
            ELSE C = 0;
         record the detected TS index as q.
END
```

For time slot index detection, if C>TH1 (e.g., C=5), then the time slot index is regarded as acquired. In some embodiments, the local time slot index counter 316 is set with an initial value that is a current detected TS index. In the coming time slot, the time slot index is counted, and the equalized data collected in the time slot does not need to be decoded unless it is TS0. Once the decoder/demux indicates the check result of the decoded data is correct, the TS index synchronizer jumps into tracking phase.

In the tracking phase, a local time slot index counter T is used as a tracking counter (at 316). The time slot index detector 312 can be operated during the entire tracking phase, or from time to time during the tracking phase. When the arrangement enters the tracking phase, E is set to 0. At the end of each valid time slot, the time slot index is detected as "p" and checked as follows:

```
IF p!=T,
    E = E+1
ELSE
    E = max(E−1, 0)
END
```

Relative to the above, for invalid time slots, some or most of the receiver is shut down (via the Rx controller output at 370) in certain implementations, to save power since an interested service is not born on invalid time slots.

At any time slot, if E>TH2 (e.g., 2), the time slot index is out of synchronization, and provides an indicator for the overall receiver controller (the Rx output from 370) to take actions when a time slot index synchronization failure occurs. Under these conditions and for some implementations, the receiver is controlled for entering a frequency/time re-synchronization phase.

For general information regarding wireless communications, and for specific information regarding approaches to wireless communications and processing that may be implemented in connection with one or more example embodiments herein, reference may be made to *Mobile Multimedia Broadcasting Part* 1: *Framing Structure, Channel Coding and Modulation for Broadcasting Channel GY/T* 220.1-2006, released by SARFT, which is fully incorporated herein by reference.

In addition to the above, the various processing approaches described herein can be implemented using a variety of devices and methods including general purpose processors implementing specialized software, digital signal processors, programmable logic arrays, discrete logic components and fully-programmable and semi-programmable circuits such as PLAs (programmable logic arrays). For example, the above algorithms are executed on a microcomputer (a.k.a. microprocessor) in connection with certain embodiments, and as may be implemented as part of one or more of the devices shown in the figures (e.g., the synchronizer 370 includes such a microcomputer for certain embodiments).

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the approaches described herein are applicable to the communication of many different types of data, over different mediums and with many different types of devices. Correspondingly, the various applications directed to the implementation of wireless communications under the Satellite Terrestrial Interactive Multi-service Infrastructure (STiMi) broadcasting scheme may be implemented using one or more other schemes, such as those relating to audio or video broadcasting or other delivery approaches, Internet-based communications, telephony-based communications and others. Wireless channels applicable for use in connection with various example embodiments include those operating in accordance with AWGN, TU6, CT8 (China test type 8 channel, typical SFN channel), and in low CNR cases (e.g., 0 dB). Such modifications and changes do not depart from the true scope of the present invention, including that set forth in the following claims.

What is claimed is:

1. A synchronizing circuit arrangement for processing wireless signals via time slot index synchronization, the synchronizing circuit arrangement comprising:
   a receiver circuit to receive wireless signals from a remote wireless transmitter, the wireless signals including signal frames with a plurality of sequential time slots in each frame, and to process the wireless signals in accordance with a synchronization condition;
   a time slot index synchronizer circuit to
      detect a beacon at the front of a time slot in a signal frame and use the beacon to set the synchronization condition for the received signal frame,
      use data in symbols that follow the beacon in the time slot to fine tune the set synchronization condition,
      detect a time slot index synchronization failure as a function of a quality characteristic of a sub-channel of one of the received signal frames,
      in response to detecting a time slot index synchronization failure in a signal frame, controlling the receiver circuit to resynchronize the time slots; and
   the synchronizer circuit operates in a synchronization acquisition phase by detecting the time slot index,
      setting the time slot index as acquired in response to a time slot index of "0" and a check result of decoded data from the signal frame being correct, and entering a tracking phase, and
      setting the time slot index as not acquired and continuing to operate in an acquisition phase in response to a check result of decoded data from the signal frame being incorrect.

2. The arrangement of claim 1, wherein
   each time slot includes a plurality of orthogonal frequency division multiplexing (OFDM) symbols, and
   the synchronizer circuit
      uses data in OFDM symbols that follow the beacon in the time slot to fine tune the set synchronization condition, and
      detects a time slot index synchronization failure as a function of a quality characteristic of a sub-channel of one of the received signal frames by detecting time slot index synchronization information embedded in sub-carriers of at least one OFDM symbol.

3. The arrangement of claim 1, wherein
   each frame includes a first time slot that is a control logic time slot, and service logic time slots after the first time slot, and
   the synchronizer circuit detects a time slot index synchronization failure as a function of a quality characteristic of a sub-channel of one of the received signal frames by detecting a quality characteristic of one of the service logic channel time slots.

4. The arrangement of claim 1, wherein the synchronizer circuit uses data in symbols that follow the beacon in the time slot to fine tune the set synchronization condition by detecting a scrambling code series in symbols following the beacon and using the detected series to fine tune the synchronization.

5. The arrangement of claim 1, wherein the receiver circuit includes
- a channel estimation and equalizer circuit to estimate the signal carried on sub-carriers in the signal frame and slice the estimated signals into soft metrics for bits, during the fine tuning of the synchronization condition, and
- a decoder and de-multiplexer circuit to decode and de-multiplex the bits from the channel estimation/equalizer circuit.

6. The arrangement of claim 5, wherein the synchronizer circuit controls the receiver to resynchronize the time slots by resetting the decoder and de-multiplexer circuit in response to a data link failure condition occurring when the time slot index synchronized.

7. The arrangement of claim 5, wherein the synchronizer circuit controls the receiver to resynchronize the time slots by refining synchronization parameters in the synchronizer circuit in response to a data link failure condition occurring when the time slot index is synchronized.

8. The arrangement of claim 1, wherein the synchronizer circuit controls the receiver to resynchronize the time slots by re-starting the receiver.

9. The arrangement of claim 1, wherein the synchronizer circuit
- determines a condition of time slot index synchronization acquisition in response to a check result of decoded data from the time slot indicating that the decoded data is correct, and
- determines a condition of failed time slot index synchronization acquisition in response to a check result of decoded data from the time slot indicating that the decoded data is incorrect.

10. The arrangement of claim 1,
- further including a decoder and de-multiplexer circuit to decode and de-multiplex data in the signal frame,
- wherein the synchronizer circuit detects a condition of synchronization acquisition in response to decoded and de-multiplexed data being correct.

11. The arrangement of claim 1, wherein the synchronizer circuit outputs a control signal to shut down circuits the receiver circuit in response to detecting an invalid time slot.

12. The arrangement of claim 1, wherein the receiver circuit and the synchronization circuit are part of a mobile device for receiving and processing remotely transmitted digital media signals.

* * * * *